United States Patent
Zope et al.

(10) Patent No.: US 11,860,615 B2
(45) Date of Patent: Jan. 2, 2024

(54) METHOD AND SYSTEM FOR ANOMALY DETECTION AND DIAGNOSIS IN INDUSTRIAL PROCESSES AND EQUIPMENT

(71) Applicant: Tata Consultancy Services Limited, Mumbai (IN)

(72) Inventors: Kalyani Bharat Zope, Pune (IN); Sri Harsha Nistala, Pune (IN); Venkataramana Runkana, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 78 days.

(21) Appl. No.: 17/436,067

(22) PCT Filed: Mar. 30, 2020

(86) PCT No.: PCT/IB2020/053015
§ 371 (c)(1),
(2) Date: Sep. 2, 2021

(87) PCT Pub. No.: WO2020/201989
PCT Pub. Date: Oct. 8, 2020

(65) Prior Publication Data
US 2022/0179406 A1 Jun. 9, 2022

(51) Int. Cl.
*G05B 23/02* (2006.01)

(52) U.S. Cl.
CPC ....... *G05B 23/024* (2013.01); *G05B 23/0221* (2013.01); *G05B 23/0254* (2013.01); *G05B 23/0281* (2013.01)

(58) Field of Classification Search
CPC ............. G05B 23/024; G05B 23/0221; G05B 23/0254; G05B 23/0281
See application file for complete search history.

(56) References Cited

U.S. PATENT DOCUMENTS

| 7,451,003 B2 | 11/2008 | Chester et al. |
| 2016/0179599 A1 | 6/2016 | Beshpande et al. |

(Continued)

FOREIGN PATENT DOCUMENTS

| CN | 108776831 A | 11/2018 |
| CN | 109035488 A | 12/2018 |

OTHER PUBLICATIONS

Piero Baraldi et al., Comparison of Data-Driven Reconstruction Methods For Fault Detection, Sep. 2015, IEEE Transactions on Reliability, vol. 64, No. 3, pp. 852-860 (Year: 2015).*

(Continued)

*Primary Examiner* — Mischita L Henson
(74) *Attorney, Agent, or Firm* — FINNEGAN, HENDERSON, FARABOW, GARRETT & DUNNER LLP (57) ABSTRACT

Industrial processes and equipment are prone to operational changes and faulty operation of such processes and equipment can adversely affect output of the overall setup. Existing systems for monitoring and fault detection consider individual instances of data for fault detection, which may not be suitable for industrial processes. Disclosed herein is a system and a method for anomaly detection in an industrial enterprise. The system collects data from a plurality of sensors as input. The system processes the collected data along temporal dimension, during which the data is split to multiple segments of fixed window size. Data in each segment is processed to identify anomalous data, and data in segments identified as containing the anomalous data is further processed to identify one or more sensors that are faulty and are contributing to the anomalous data.

12 Claims, 5 Drawing Sheets

(56) References Cited

U.S. PATENT DOCUMENTS

| | | | |
|---|---|---|---|
| 2016/0232440 A1 | 8/2016 | Gregor et al. | |
| 2017/0147905 A1 | 5/2017 | Huang et al. | |
| 2017/0273632 A1* | 9/2017 | Ukil | G16H 50/30 |
| 2019/0368133 A1* | 12/2019 | Joshi | G06T 7/11 |

OTHER PUBLICATIONS

Ellefsen et al., An Unsupervised Reconstruction-Based Fault Detection Algorithm for Maritime Components, Jan. 2019, IEEE Access, vol. 7, pp. 16101-16109 (Year: 2019).*

Author: Chuxu Zhang, Dongjin Song, Yuncong Chen, Xinyang Feng, Cristian Lumezanu, Wei Cheng, Jingchao Ni, Bo Zong, Haifeng Chen, Nitesh V. Chawla Title: A Deep Neural Network for Unsupervised Anomaly Detection and Diagnosis in Multivariate Time Series Data Title of the item: Machine Learning Date: Nov. 2018 Publisher: Arxiv Link: https://arxiv.org/pdf/1811.08055.pdf.

Author: Dong Yul Oh and Dong Yun Title: Residual Error Based Anomaly Detection Using Auto-Encoder in SMD Machine Sound Title of the item: Sensors Date: Apr. 2018 vol. 18 (5) Publisher: MDPI Link: https://www.mdpi.com/1424-8220/18/5/1308.

Author: Mohsin Munir, Shoaib Ahmed Siddiqui, Andreas Dengel, and Sheraz Ahmed Title: DeepAnT: A Deep Learning Approach for Unsupervised Anomaly Detection in Time Series Title of the item: Access Date: Dec. 2018 vol. 7 pp. 1991-2005 Publisher: IEEE Link: https://ieeexplore.ieee.org/stamp/stamp.jsp?tp=&arnumber=8581424.

Author: Ran Zhang, Zhen Peng, Lifeng Wu, Beibei Yao, Yong Guan Title: Fault Diagnosis from Raw Sensor Data Using Deep Neural Networks Considering Temporal Coherence Title of the item: Sensor Date: Mar. 2017 vol. 17 (3) Publisher: NCBI Link: https://www.mdpi.com/1424-8220/17/3/549.

Author: Seongwoon Jeong, Max Ferguson, Kincho H. Law Title: Sensor data reconstruction and aomaly detection using bidirectional recurrent neural network Title of the item: Sensors and Smart Structures Technologies for Civil, Mechanical, and Aerospace Systems Date: Mar. 2019 vol. 10970 Publisher: SPIE.Digital Liabrary Link: http://eil.stanford.edu/publications/seongwoon_jeong/SPIE_2019_1.pdf.

International Search Report for PCT/IB20/53015 dated Aug. 14, 2020.

Written Opinion of the International Searching Authority for PCT/IB20/53015 dated Aug. 14, 2020.

* cited by examiner

METHOD AND SYSTEM FOR ANOMALY DETECTION AND DIAGNOSIS IN INDUSTRIAL PROCESSES AND EQUIPMENT

CROSS REFERENCE TO RELATED PATENT APPLICATIONS AND PRIORITY

The present application is a US National Stage Filing and claims priority to from International Application No. PCT/162020/053015 filed on March 30th, 2020, which application claims priority from India Patent Application No. 201921012444, filed before Indian Patent Office on Mar. 29, 2019. Entire contents of the aforementioned applications are incorporated herein by reference.

TECHNICAL FIELD

The disclosure herein generally relates to monitoring industrial processes and systems, and, more particularly, to method and system for detecting and diagnosing anomalies in the industrial processes and systems.

BACKGROUND

In manufacturing and process plants, massive amounts of data are gathered by process and equipment sensors. This data represents the actual operational behavior of the plants and can be used to detect and diagnose anomalous behavior of the process or equipment. Anomalies are unusual patterns in data which do not conform to a notion of normal behavior. Anomalies can be categorized into two types viz. 'point anomalies' and 'contextual anomalies'. Point anomalies are those that can be considered anomalous with respect to the rest of the data whereas 'contextual anomalies' are those that are anomalous in a specific context but not otherwise. Anomalies that occur in time series data collected from manufacturing and process industries are typically contextual in nature. For example, anomalous behavior in one operating regime may not be anomalous in another operating regime.

Anomaly detection and diagnosis is a challenging task due to the complex behavior of processes, interactions among sensors, and variability in anomalous behavior. Significant research effort has gone into developing effective data driven techniques for anomaly detection and diagnosis. However, all of the available techniques consider individual points (or instances) in the data to be independent of one another. This assumption is not valid for industrial data where the temporal behavior of sensor data is important. This limits the applicability of available techniques for anomaly detection and diagnosis in industrial data.

SUMMARY

Embodiments of the present disclosure present technological improvements as solutions to one or more of the above-mentioned technical problems recognized by the inventors in conventional techniques. For example, in one embodiment, a processor implemented method of anomaly detection and diagnosis is provided. An input data from a plurality of sensors is collected, via one or more hardware processors, wherein the input data is a multivariate time series data. Further, the input data is divided into a plurality of segments along the temporal dimension each having a fixed window size, via the one or more hardware processors, and then the input data in each segment is processed via the one or more hardware processors. During processing of the input data in each segment, a plurality of features from the input data in the segment being processed are extracted at a plurality of stages, using an encoding mechanism. Further the input data in the segment is reconstructed using the extracted plurality of features using a decoding mechanism. Further, a reconstruction error value for each instance in each of the segments is calculated, corresponding to the reconstruction of the input data using the plurality of features. Further, the reconstruction error value of each of the instances in each of the plurality of segments is compared with a threshold of reconstruction error. Further, all segments for which the reconstruction error value exceeds the threshold of reconstruction error in at least one instance are determined as segments containing anomalous data, and then at least one of the plurality of sensors is identified as faulty, based on the input data in the segments determined as containing the anomalous data.

In another aspect, a system for anomaly detection and diagnosis is provided. The system includes a memory storing a plurality of instructions, one or more communication interfaces, and one or more hardware processors coupled to the memory via the one or more communication interfaces. The one or more hardware processors are caused by the plurality of instructions to execute the following method to perform the anomaly detection and diagnosis. An input data from a plurality of sensors is collected, via one or more hardware processors, wherein the input data is a multivariate time series data. Further, the input data is divided into a plurality of segments along the temporal dimension each having a fixed window size, via the one or more hardware processors, and then the input data in each segment is processed via the one or more hardware processors. During processing of the input data in each segment, a plurality of features from the input data in the segment being processed are extracted at a plurality of stages, using an encoding mechanism. Further the input data in the segment is reconstructed using the extracted plurality of features using a decoding mechanism. Further, a reconstruction error value for each instance in each of the segments is calculated, corresponding to the reconstruction of the input data using the plurality of features. Further, the reconstruction error value of each of the instances in each of the plurality of segments is compared with a threshold of reconstruction error. Further, all segments for which the reconstruction error value exceeds the threshold of reconstruction error in at least one instance are determined as segments containing anomalous data, and then at least one of the plurality of sensors is identified as faulty, based on the input data in the segments determined as containing the anomalous data.

In yet another aspect, a non-transitory computer readable medium for anomaly detection and diagnosis is provided. The non-transitory computer readable medium executes the following method for performing the anomaly detection and diagnosis. An input data from a plurality of sensors is collected, via one or more hardware processors, wherein the input data is a multivariate time series data. Further, the input data is divided into a plurality of segments along the temporal dimension each having a fixed window size, via the one or more hardware processors, and then the input data in each segment is processed via the one or more hardware processors. During processing of the input data in each segment, a plurality of features from the input data in the segment being processed are extracted at a plurality of stages, using an encoding mechanism. Further the input data in the segment is reconstructed using the extracted plurality of features using a decoding mechanism. Further, a reconstruction error value for each instance of each of the segments is calculated, corresponding to the reconstruction of the input data using the plurality of features. Further, the reconstruction error value of each instance of each of the plurality of segments is compared with a threshold reconstruction error. Further, all segments for which the reconstruction error value exceeds the threshold of reconstruction error in at least one instance are determined as segments containing anomalous data, and then at least one of the plurality of sensors is identified as faulty, based on the input data in the segments determined as containing the anomalous data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 (including FIG. 2A and FIG. 2B) is a flow diagram depicting steps involved in the process of anomaly detection and diagnosis, using the system of FIG. 1, according to some embodiments of the present disclosure.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Any industrial enterprise includes one or more industrial processes and one or more equipment that is used to execute the one or more industrial processes. If any of the processes and/or equipment are faulty i.e. malfunctioning, overall output of the industrial enterprise is affected. The industrial enterprise can be monitored during which real-time data pertaining to working of the processes and/or the one or more equipment is collected and processed to perform a health estimation of the process/equipment and/or to verify accuracy of output of the process/equipment.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1:
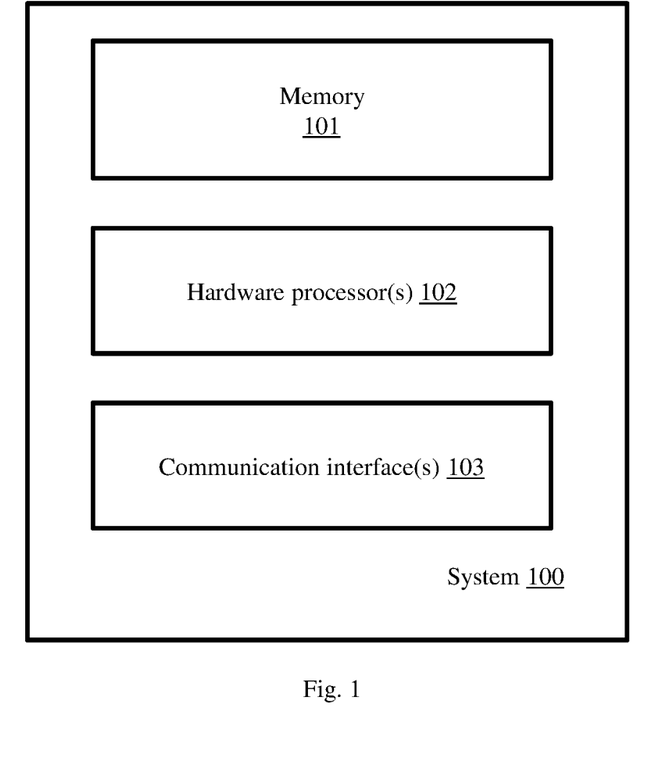
FIG. 1 illustrates an exemplary system for anomaly detection and diagnosis in industrial processes and equipment, according to some embodiments of the present disclosure.

FIG. 1 illustrates an exemplary system for anomaly detection and diagnosis in industrial processes and equipment, according to some embodiments of the present disclosure. The system 100 includes at least one memory 101, at least one hardware processor 102, and at least one communication interface 103.

The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the hardware processor(s) 102 are configured to fetch and execute computer-readable instructions stored in the memory 101, which causes the hardware processor(s) 102 to perform actions depicted in FIG. 2, FIG. 3, and FIG. 4 for the purpose of detecting and diagnosing anomalies. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 101. The memory 101 stores a plurality of instructions which when executed cause the one or more hardware processors 102 to perform the anomaly detection and diagnosis.

One or more sensors being used to collect real-time input pertaining to one or more processes and/or equipment being monitored can communicate with the system 100 through one or more suitable interfaces provided by the communication interface(s) 103, and can facilitate transfer of the data from the sensor(s) to the system 100. In various embodiments, different types of sensors may be installed/deployed/used for collecting appropriate data, which means the system 100 may be collecting different types of data simultaneously. In an example, the sensor is a physical sensor. In another example, the sensor may be a data-based soft-sensor/physics-based soft sensor being used to simulate the required data in the absence/unavailability of original data or physical sensors. The input data collected by the system 100 is multivariate time-series data. Further, the process being monitored could be one or more unit operations or processes from manufacturing or process industries such as iron and steel making, power generation, pharma manufacturing, refineries, cement making, oil and gas production, fine chemical production and so on, and the equipment could be any equipment used in the unit operations or processes in manufacturing and process industries, such as but not limited to valves, compressors, blowers, pumps, steam turbines, gas turbines, heat exchangers, chemical reactors, bio-reactors, condensers, and boilers.

As the data collected from the different types of sensors may be of different sampling frequencies, may be in different formats and may have gaps due to communication problems or failed sensors, initially the system 100 may have to pre-process the collected data to fill the gaps, and to convert the collected data to a standard format for further processing. The system 100 then divides the input data to a plurality of segments of a specific window size along the temporal dimension, wherein the window size of each of the plurality of segments is pre-defined and configured with the system 100. In various embodiments, the window size of each of the plurality of segments is pre-configured or dynamically configured with the system 100. After dividing the input data to the plurality of segments, the system 100 further processes the input data in each of the plurality of segments.

During the processing of the input data in each segment, the system 100 extracts a plurality of features corresponding to the input data, at a plurality of different stages. In this context the term 'feature' represents a reduced dimensional data of the input data, using an encoding mechanism. In the encoding mechanism, the input data is passed through multiple sets of convolution layers and pooling layers present in the system 100 (not shown), wherein the number of sets of the convolution layers and pooling layers may vary as per requirements and may be configured/re-configured based on the requirements. In an example embodiment, consider that two sets of convolution layers and pooling layers present in the system 100. The system 100 initially passes the input data (in a segment being considered) through a first convolution layer, and output of the first convolution layer is passed through a first pooling layer that forms the first set of convolution layer and pooling layer. Output of the first set of convolution layer and pooling layer is then passed through the convolution layer and the pooling layer that form the second set of convolution layer and pooling layer. Output of each set of convolution layer and pooling layer forms multiple features, the number of which is lower than the number of sensors/features in the input data to the set of convolution layer and pooling layer. Processing of the input data using different sets of convolution layers and pooling layers is referred to as extraction of the features at the plurality of different stages.

After extracting a plurality of features from the input data being processed, the system 100 uses a decoding mechanism to reconstruct the input data from the extracted features. During the decoding mechanism, the system 100 passes the features through multiple sets of de-convolution layers and up-sampling layers. Output of final set of de-convolution layer and up-sampling layer is reconstructed data, which is expected to have same dimension of the input data.

The system 100 maintains in the memory 101 a Convolutional Autoencoder (ConvAE) data model. The ConvAE data model is generated using historic data pertaining to a normal working (i.e. when there was no error/malicious data) of the equipment(s)/the process(es). In this process, so as to use the temporal dependency of time-series data, data is divided into fixed windows along temporal dimension. A data splitter method is used to divide fixed window size into two sets i.e. a training data, and a validation data. The training data is used to train the ConvAE model in order to optimize cost function. Cost function can be mean squared error (MSE), absolute error (AE) or mean absolute percentage error (MAPE) between the input data and the reconstructed data. The weights and biases in ConvAE are updated so that cost is as low as possible. The validation data set comprises validation data that is used for unbiased evaluation of the ConvAE data model while tuning hyper parameters of the ConvAE data model, and is reconstructed using the trained ConvAE data model.

By using the ConvAE data model, the system 100 calculates a reconstruction error (RE) value for each instance in each of the plurality of segments, wherein the RE value at an instance represents extent of deviation between the (original) input data and the reconstructed data at that instance. The terms 'reconstruction error value' and 'RE value' are used interchangeably throughout the specification and claims. The RE value is calculated as at least one of an absolute difference, squared difference, percentage difference, between the original and reconstructed data. Equations used for calculating each of these errors is given below:

Absolute difference reconstruction error $$RE_i = \frac{1}{m}\sum_{j=1}^{m} |X_{i,j} - X'_{i,j}| \qquad (1)$$

Squared difference reconstruction error $$RE_i = \frac{1}{m}\sum_{j=1}^{m} (X_{i,j} - X'_{i,j})^2 \qquad (2)$$

Percentage difference reconstruction error $$RE_i = \frac{1}{m}\sum_{j=1}^{m} \frac{|X_{i,j} - X'_{i,j}|}{X_{i,j}} \times 100 \qquad (3)$$

where $RE_i$ is the reconstruction error value for instance or time i $X_{i,j}$ is the original value of sensor j at instance or time i $X'_{i,j}$ is the reconstructed value of sensor j at instance or time i m is the total number of sensors The threshold for the reconstruction error, beyond which the instance is classified as anomalous, is obtained as $\mu+K\sigma$ where $\mu$ and $\sigma$ are the mean and standard deviation of all the reconstruction errors and K is a user-defined parameter such that 95% or 99% of the reconstruction error values are lower than the threshold of reconstruction error.

The RE value is calculated separately for each instance in each of the plurality of segments. The RE value of each of the instances is compared with the threshold of RE. If for any instance the RE value exceeds the threshold of RE, then that particular segment containing the instance is classified as containing anomalous data. The segments for which the RE value does not exceed the threshold of RE are considered as not containing anomalous data (i.e. containing normal data).

After identifying the segments containing the anomalous data, the next step is diagnosis, which consists of identification of the subset of sensors that caused/contributed to the anomaly from among all the sensors. In this step, the system 100 processes input data in only those segments which have been identified as containing the anomalous data. For each segment considered, the system 100 identifies all source sensors that are contributing to the input data in the considered segments. For example, consider that in a particular segment the input data corresponds to temperature and pressure values, then one or more temperature sensors and one or more pressure sensors are contributing to the input data in that particular segment. After identifying all the source sensors, the system 100 calculates a sensor reconstruction error (RE) value for each of the identified sensors, wherein the sensor RE value of each of the sensors represents extent of deviation between the (original) input data and the reconstructed data for the sensor (i.e. at a sensor level). The sensor reconstruction error for each sensor is calculated as one of the absolute difference, squared difference and percentage absolute difference between the original and reconstructed data for each sensor. Absolute difference reconstruction error for each sensor $$RES_{i,j} = |X_{i,j} - X'_{i,j}| \quad (4)$$

Squared difference reconstruction error for each sensor $$RES_{i,j} = (X_{i,j} - X'_{i,j})^2 \quad (5)$$

Percentage difference reconstruction error for each sensor $$RES_{i,j} = \frac{|X_{i,j} - X'_{i,j}|}{X_{i,j}} \times 100 \quad (6)$$

where $RES_{i,j}$ is the reconstruction error value for instance or time i for sensor j $X_{i,j}$ is the original value of sensor j at instance or time i $X'_{i,j}$ is the reconstructed value of sensor j at instance or time i The threshold of the sensor reconstruction error for each sensor j, beyond which the sensor is identified to be causing the anomaly, is obtained as $\mu_j + K_j\sigma_j$ where $\mu_j$ and $\sigma_j$ are the mean and standard deviation of all the reconstruction errors for sensor j. K is a user-defined parameter such that 95% or 99% of the reconstruction error values are lower than the threshold of reconstruction error.

The calculated sensor RE value of each of the sensors is compared with the corresponding threshold of sensor RE. If for any of the sensors the sensor RE value exceeds the threshold of sensor RE, that particular sensor is identified as a faulty sensor or causing the anomaly.

After identifying all the faulty sensors, the system 100 may report the same to one or more users in any appropriate format pre-configured. For example, the system 100 may display any unique ID of the faulty sensors along with the corresponding sensor RE values and difference with the threshold of sensor RE, via an appropriate user interface provided by the communication interface(s) 103, so that the user may be able to assess extent of error in the values/data generated by each of the sensors. In another example, the system 100 may display data pertaining to faulty sensors identified at any given time instance (as in Table 1).

TABLE 1

| Time (instance) | Normal/anomalous | Faulty sensor 1 | Faulty sensor 2 | Faulty sensor 3 |
|---|---|---|---|---|
| Jan. 1, 2018 00:00:01 | Normal | — | — | — |
| Jan. 1, 2018 00:00:02 | Anomalous | T101 | — | — |
| Jan. 1, 2018 00:00:03 | Anomalous | T101 | P023 | — |

The system 100 may further allow the user to save and/or download the data pertaining to the RE values of each of the sensors, with a time stamp, in any suitable format. The system 100 may be further configured to store the data pertaining to the RE values of each of the instances in each of the segments, the RE value of each of the sensors, the threshold of RE (overall and sensor level), data pertaining to the faulty sensors identified and so on, in one or more databases in the memory 101, and may allow authorized users to access the data for reference at any point of time.

Figure 2A:
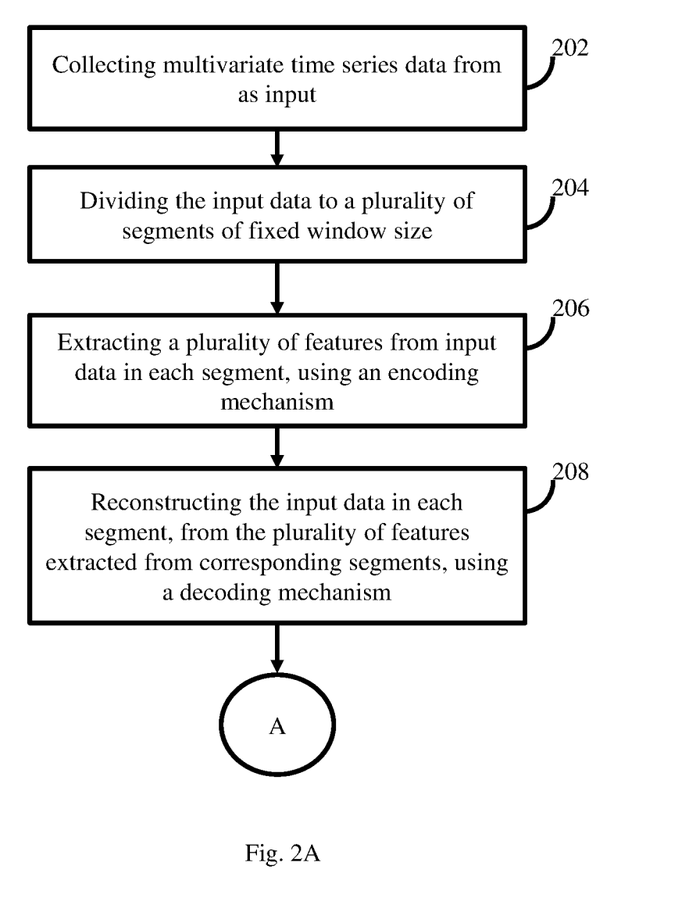
Figure 2B:
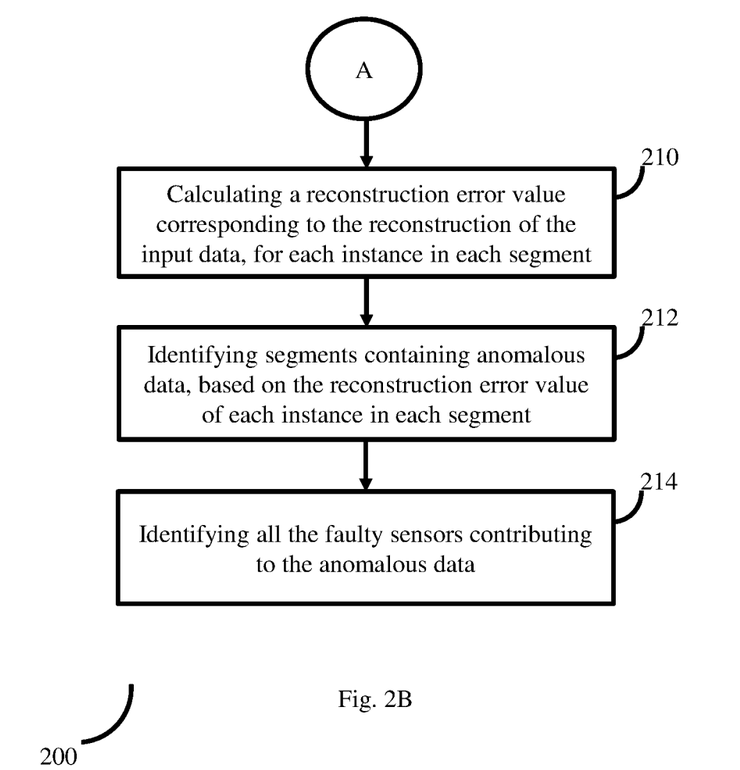

FIG. 2 (including FIG. 2A and FIG. 2B) is a flow diagram depicting steps involved in the process of anomaly detection and diagnosis, using the system of FIG. 1, according to some embodiments of the present disclosure. The system 100 collects (202) multivariate time series data from a plurality of sensors as input, and then divides (204) the collected multivariate time series data to a plurality of segments having a fixed window size. The system 100 then extracts (206) a plurality of features from each of the plurality of segments, using an encoding mechanism. The system 100 then uses a decoding mechanism to reconstruct (208) the input data in each of the plurality of segments, from the corresponding features extracted. After reconstructing the input data using the decoding mechanism, the system 100 calculates (210) a RE value for each of the instances in each of the segments, wherein the RE value of each of the instances represents extent of deviation of the original input data in the instance and the reconstructed data in the instance. The system 100 then compares the RE value of each of the instances with a threshold of RE, and all the segments for which the RE value of at least one of the instances exceeds the threshold of RE are identified (212) as segments containing anomalous data. The system 100 then identifies (214) all the faulty sensors that contribute to the anomalous data in the segments identified.

Figure 3:
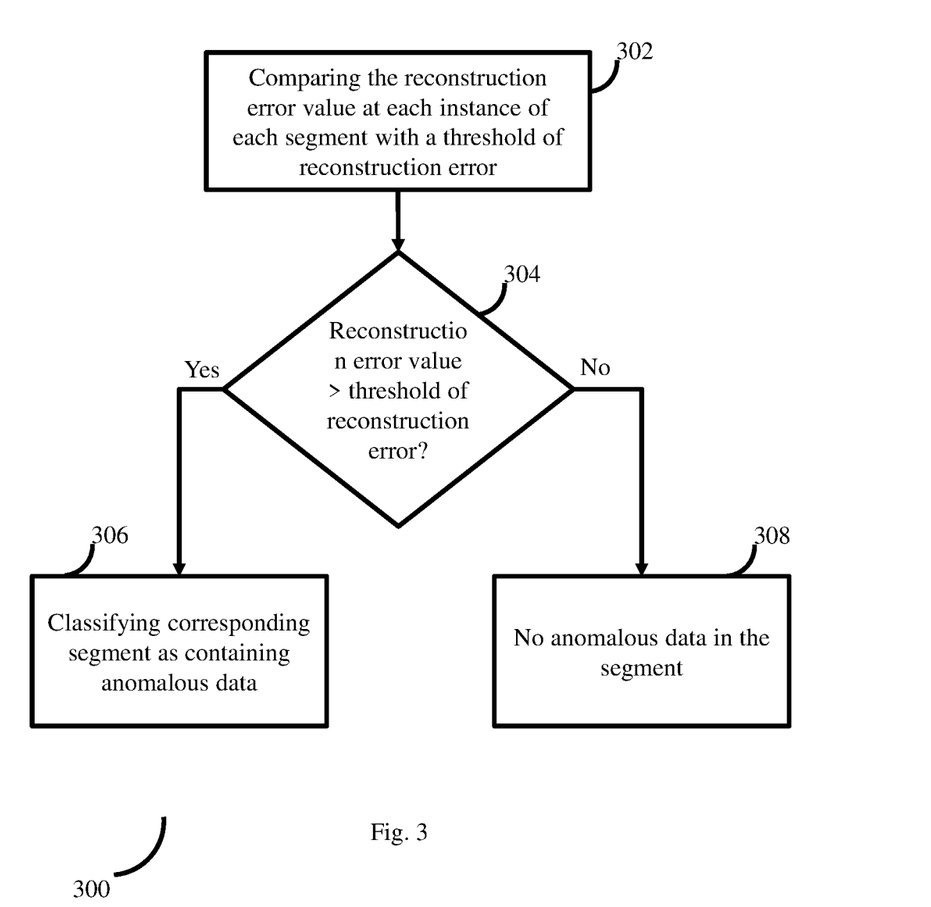
FIG. 3 is a flow diagram depicting steps involved in the process of identifying segments of input data that contain anomalous data, using the system of FIG. 1, according to some embodiments of the present disclosure.

FIG. 3 is a flow diagram depicting steps involved in the process of identifying segments of input data that contain anomalous data, using the system of FIG. 1, according to some embodiments of the present disclosure. In order to identify whether a segment contains anomalous data, the system 100 compares (302) the RE value of the instance with a threshold of RE value. If the RE value of at least one instance exceeds the threshold of RE, then the segment containing the instance is classified (306) as containing the anomalous data. If the RE value of all the instances is lower than the threshold of RE, then the segment is identified as containing no anomalous data (308). In an embodiment, the threshold of RE is determined using the ConvAE data model.

Figure 4:
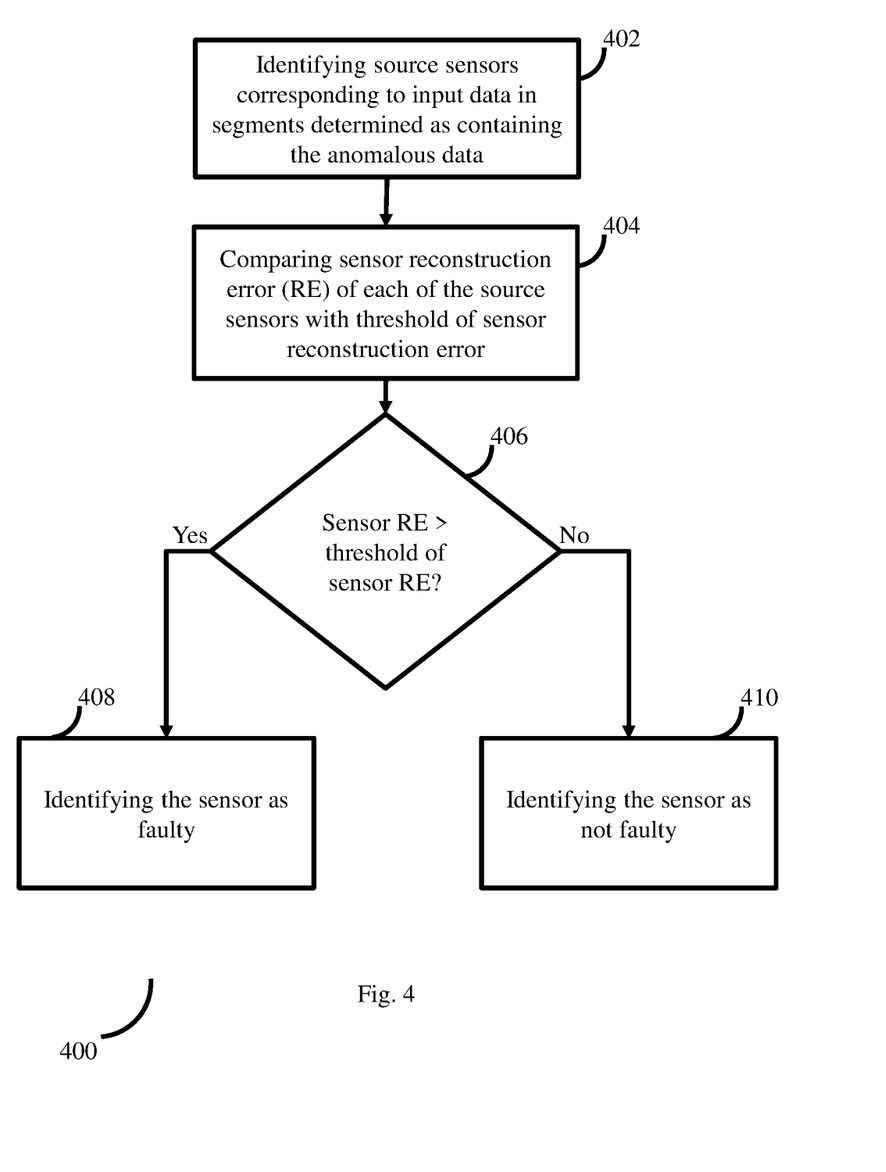
FIG. 4 is a flow diagram depicting steps involved in the process of identifying one or more sensors as faulty, using the system of FIG. 1, according to some embodiments of the present disclosure.

FIG. 4 is a flow diagram depicting steps involved in the process of identifying one or more sensors as faulty, using the system of FIG. 1, according to some embodiments of the present disclosure. For each segment identified as containing the anomalous data, the system 100 identifies (402) all source sensors that are contributing to the input data in the segments considered. After identifying all the source sensors, the system 100 calculates a reconstruction error (RE) value for each of the identified sensors, wherein the RE value of each of the sensors represents extent of deviation between the (original) input data and the reconstructed data for the sensor (i.e. at a sensor level). The calculated RE value of each of the sensors is compared (404) with a threshold of sensor RE. If for any of the sensors the RE value exceeds the threshold of sensor RE, that particular sensor is identified (408) as a faulty sensor. The sensors for which the RE value does not exceed the threshold of sensor RE are identified (410) as not faulty/in normal working condition.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of detection and diagnosis of anomalous data in an industrial enterprise. The embodiment, thus provides a mechanism to identify anomalous data in the industrial processes/equipment being monitored. Moreover, the embodiments herein further provide a mechanism to identify a sensor as faulty or normal, by processing the data collected from the sensors.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

The invention claimed is:

1. A processor implemented method of anomaly detection and diagnosis, comprising:
   collecting an input data from a plurality of sensors, via one or more hardware processors, wherein the input data is a multivariate time series data;
   dividing the input data into a plurality of segments, via the one or more hardware processors, wherein each of the plurality of segments has fixed window size; and
   processing the input data in each of the plurality of segments, via the one or more hardware processors, comprising:
      extracting a plurality of features from the input data in the segment being processed, at a plurality of stages, using an encoding mechanism;
      reconstructing the input data in the segment, by processing the extracted plurality of features using a decoding mechanism;
      calculating a reconstruction error value (RE) for each instance in each of plurality of segments, corresponding to the reconstruction of the input data using the plurality of features, wherein the RE value is calculated as at least one of an absolute difference as $$RE_i = \frac{1}{m}\sum_{j=1}^{m} |X_{i,j} - X'_{i,j}|,$$

squared absolute difference as $$\frac{1}{m}\sum_{j=1}^{m} (X_{i,j} - X'_{i,j})^2,$$

percentage absolute difference $$\frac{1}{m}\sum_{j=1}^{m} \frac{|x_{i,j} - x'_{i,j}|}{x_{i,j}} \times 100,$$

between the original and reconstructed data, where $RE_i$, is the reconstruction error value for instance or time i, $X_{i,j}$ is an original value of sensor j at instance or time i, $X'_{i,j}$ is a reconstructed value of sensor j at instance or time i, m is total number of sensors;

identifying (212) one or more segments from among the plurality of segments as segments containing anomalous data, comprising:

comparing the reconstruction error value of each of the instance with a threshold of reconstruction error, wherein the threshold of the reconstruction error is obtained as $\mu+K\sigma$ where $\mu$ and $\sigma$ are the mean and standard deviation of all the reconstruction errors and K is a user-defined parameter such that 95% or 99% of the reconstruction error values are lower than the threshold of reconstruction errors; and         determining all segments in which the reconstruction error value exceeds the threshold of reconstruction error in at least one instance, as segments containing anomalous data; and     identifying at least one of the plurality of sensors as faulty, based on the input data in the segments determined as containing the anomalous data.

2. The method as claimed in claim 1, wherein identifying the at least one sensor as faulty comprising:

identifying the at least one sensor as a source sensor corresponding to the input data in all the segments determined as containing the anomalous data;

comparing a reconstruction error value of the at least one sensor with a threshold of sensor reconstruction error, wherein the reconstruction error value of the at least one sensor is calculated as at least one of an absolute difference as $$RES_{i,j} = |X_{i,j} - X'_{i,j}|$$

squared absolute difference $$RES_{i,j} = (X_{i,j} - X'_{i,j})^2$$

percentage absolute difference $$RES_{i,j} = \frac{|x_{i,j} - x'_{i,j}|}{x_{i,j}} \times 100,$$

between the original and reconstructed data, where $RES_{i,j}$ is the reconstruction error value for instance or time i for sensor j, $X_{i,j}$ is an original value of sensor j at instance or time i, $X'_{i,j}$ is a reconstructed value of sensor j at instance or time i;; and     determining the at least one sensor as faulty if the reconstruction error value of the at least one sensor exceeds the threshold of sensor reconstruction error, wherein the threshold is obtained as $\mu_j+K_j\sigma_j$ where $\mu_j$ and $\sigma_j$ are mean and standard deviation of all the reconstruction errors for sensor j, K is a user-defined parameter such that 95% or 99% of the reconstruction error values are lower than the threshold of reconstruction error.

3. The method as claimed in claim 1, wherein extracting the plurality of features using the encoding mechanism comprising generating a reduced dimensional data corresponding to the input data by passing the input data through a plurality convolution neural networks and pooling networks.

4. The method as claimed in claim 1, wherein reconstructing the input data from the features using the decoding mechanism comprising passing a reduced dimensional data corresponding to the input data through a plurality deconvolutional neural networks and up-sampling networks.

5. A system for anomaly detection and diagnosis, said system comprising:

a memory storing a plurality of instructions;

one or more communication interfaces; and one or more hardware processors coupled to the memory via the one or more communication interfaces, wherein the one or more hardware processors are caused by the plurality of instructions to:

collect an input data from a plurality of sensors, wherein the input data is a multivariate time series data;

divide the input data into a plurality of segments, wherein each of the plurality of segments has a fixed window size; and         process input data in each of the plurality of segments, by:

extracting a plurality of features from the input data in the segment being processed, at a plurality of stages, using an encoding mechanism;

reconstructing the input data in the segment, by processing the extracted plurality of features using a decoding mechanism;

calculating a reconstruction error value (RE) for each instance in each of plurality of segments, corresponding to the reconstruction of the input data using the plurality of features, wherein the RE value is calculated as at least one of an absolute difference as $$RE_i = \frac{1}{m}\sum_{j=1}^{m} |X_{i,j} - X'_{i,j}|,$$

squared absolute difference as $$\frac{1}{m}\sum_{j=1}^{m} (X_{i,j} - X'_{i,j})^2,$$

percentage absolute difference $$\frac{1}{m}\sum_{j=1}^{m} \frac{|x_{i,j} - x'_{i,j}|}{x_{i,j}} \times 100,$$

between the original and reconstructed data, where $RE_i$ is the reconstruction error value for instance or time i, $X_{i,j}$ is an original value of sensor j at instance or time i, $X'_{i,j}$ is a reconstructed value of sensor j at instance or time i, m is total number of sensors;

identifying (212) one or more segments from among the plurality of segments as segments containing anomalous data, comprising:

comparing the reconstruction error value of each of the instance with a threshold of reconstruction error, wherein the threshold of the reconstruction error is obtained as $\mu+K\sigma$ where $\mu$ and $\sigma$ are the mean and standard deviation of all the reconstruction errors and K is a user-defined parameter such that 95% or 99% of the reconstruction error values are lower than the threshold of reconstruction errors; and determining all segments in which the reconstruction error value exceeds the threshold of reconstruction error in at least one instance, as segments containing anomalous data; and identifying at least one of the plurality of sensors as faulty, based on the input data in the segments determined as containing the anomalous data.

6. The system as claimed in claim 5, wherein the system identifies the at least one sensor as faulty by:

identifying the at least one sensor as a source sensor corresponding to the input data in all the segments determined as containing the anomalous data;

comparing a reconstruction error value of the at least one sensor with a threshold of sensor reconstruction error, wherein the reconstruction error value of the at least one sensor is calculated as at least one of an absolute difference as $RES_{i,j} = |X_{i,j} - X'_{i,j}|$ squared absolute difference $RES_{i,j} = (X_{i,j} - X'_{i,j})^2$ percentage absolute difference $$RES_{i,j} = \frac{|x_{i,j} - x'_{i,j}|}{x_{i,j}} \times 100,$$

between the original and reconstructed data, where $RES_{i,j}$ is the reconstruction error value for instance or time i for sensor j, $X_{i,j}$ is an original value of sensor j at instance or time i, $X'_{i,j}$ is a reconstructed value of sensor j at instance or time i; and determining the at least one sensor as faulty if the reconstruction error value of the at least one sensor exceeds the threshold of sensor reconstruction error, wherein the threshold is obtained as $\mu_j + K_j\sigma_j$ where $\mu_j$ and $\sigma_j$ are mean and standard deviation of all the reconstruction errors for sensor j, K is a user-defined parameter such that 95% or 99% of the reconstruction error values are lower than the threshold of reconstruction error.

7. The system as claimed in claim 5, wherein the system extracts the plurality of features using the encoding mechanism by generating a reduced dimensional data corresponding to the input data by passing the input data through a plurality convolution neural layers and pooling layers.

8. The system as claimed in claim 5, wherein the system reconstructs the input data from the features using the decoding mechanism by passing a reduced dimensional data corresponding to the input data through a plurality deconvolutional neural layers and up-sampling layers.

9. A non-transitory computer readable medium for anomaly detection and diagnosis, the non-transitory computer readable medium performs the anomaly detection and diagnosis, comprising:

collecting an input data from a plurality of sensors, via one or more hardware processors, wherein the input data is a multivariate time series data;

dividing the input data into a plurality of segments, via the one or more hardware processors, wherein each of the plurality of segments has fixed window size; and processing the input data in each of the plurality of segments, via the one or more hardware processors, comprising:

extracting a plurality of features from the input data in the segment being processed, at a plurality of stages, using an encoding mechanism;

reconstructing the input data in the segment, by processing the extracted plurality of features using a decoding mechanism;

calculating a reconstruction error value (RE) for each instance in each of plurality of segments, corresponding to the reconstruction of the input data using the plurality of features wherein the RE value is calculated as at least one of an absolute difference as $$RE_i = \frac{1}{m}\sum_{j=1}^{m} |X_{i,j} - X'_{i,j}|,$$

squared absolute difference as $$\frac{1}{m}\sum_{j=1}^{m} (X_{i,j} - X'_{i,j})^2,$$

percentage absolute difference $$\frac{1}{m}\sum_{j=1}^{m} \frac{|x_{i,j} - x'_{i,j}|}{x_{i,j}} \times 100,$$

between the original and reconstructed data, where $RE_i$, is the reconstruction error value for instance or time i, $x_ij$ is an original value of sensor j at instance or time i, $X'_{i,j}$ is a reconstructed value of sensor j at instance or time i, m is total number of sensors;

identifying (212) one or more segments from among the plurality of segments as segments containing anomalous data, comprising:

comparing the reconstruction error value of each of the instance with a threshold of reconstruction error, wherein the threshold of the reconstruction error is obtained as $\mu + K\sigma$ where $\mu$ and $\sigma$ are the mean and standard deviation of all the reconstruction errors and K is a user-defined parameter such that 95% or 99% of the reconstruction error values are lower than the threshold of reconstruction errors; and determining all segments in which the reconstruction error value exceeds the threshold of reconstruction error in at least one instance, as segments containing anomalous data; and identifying at least one of the plurality of sensors as faulty, based on the input data in the segments determined as containing the anomalous data.

10. The non-transitory computer readable medium as claimed in claim 9, wherein identifying the at least one sensor as faulty comprising:

identifying the at least one sensor as a source sensor corresponding to the input data in all the segments determined as containing the anomalous data;

comparing a reconstruction error value of the at least one sensor with a threshold of sensor reconstruction error, wherein the reconstruction error value of the at least one sensor is calculated as at least one of an absolute difference as $RES_{i,j} = |X_{i,j} - X'_{i,j}|$ squared absolute difference $RES_{i,j} = (X_{i,j} - X'_{i,j})^2$ percentage absolute difference $$RES_{i,j} = \frac{|x_{i,j} - x'_{i,j}|}{x_{i,j}} \times 100,$$

between the original and reconstructed data, where $RES_{i,j}$ is the reconstruction error value for instance or time i for sensor j, $X_{i,j}$ is an original value of sensor j at instance or time i, $X'_{i,j}$ is a reconstructed value of sensor j at instance or time; and determining the at least one sensor as faulty if the reconstruction error value of the at least one sensor exceeds the threshold of sensor reconstruction error, wherein the threshold is obtained as $\mu_j + K_j \sigma_j$ where $\mu_j$ and $\sigma_j$ are mean and standard deviation of all the reconstruction errors for sensor j, K is a user-defined parameter such that 95% or 99% of the reconstruction error values are lower than the threshold of reconstruction error.

11. The non-transitory computer readable medium as claimed in claim 9, wherein extracting the plurality of features using the encoding mechanism comprising generating a reduced dimensional data corresponding to the input data by passing the input data through a plurality convolution neural networks and pooling networks.

12. The non-transitory computer readable medium as claimed in claim 9, wherein reconstructing the input data from the features using the decoding mechanism comprising passing a reduced dimensional data corresponding to the input data through a plurality de-convolutional neural networks and up-sampling networks.

\* \* \* \* \*